(12) United States Patent
Ripley

(10) Patent No.: US 10,596,633 B1
(45) Date of Patent: Mar. 24, 2020

(54) SHAPED CUTTING TOOL

(71) Applicant: Consolidated Nuclear Security, LLC, Oak Ridge, TN (US)

(72) Inventor: Edward B. Ripley, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 0 days.

(21) Appl. No.: 15/409,887

(22) Filed: Jan. 19, 2017

(51) Int. Cl.
*B23B 27/06* (2006.01)
*B23B 27/04* (2006.01)

(52) U.S. Cl.
CPC .............. *B23B 27/06* (2013.01); *B23B 27/04* (2013.01); *B23B 2220/24* (2013.01); *B23B 2229/08* (2013.01)

(58) Field of Classification Search
CPC ....... B23B 27/04; B23B 27/06; B23B 29/043; B23B 2220/24; B23B 2229/08; B23B 27/045; B23B 27/065; B23B 27/1611
See application file for complete search history.

(56) References Cited

U.S. PATENT DOCUMENTS

| | | | | |
|---|---|---|---|---|
| 1,365,683 A | * | 1/1921 | Griffith | B23B 27/06 29/35.5 |
| 1,626,936 A | | 5/1927 | Ingham | |
| 2,183,796 A | * | 12/1939 | Saffady | B23B 27/06 407/87 |
| 2,424,041 A | * | 7/1947 | Luers | B23B 27/06 407/117 |
| 2,534,230 A | * | 12/1950 | Chandler | B23B 27/06 407/120 |
| 2,584,321 A | * | 2/1952 | Auer | B23B 27/06 407/10 |
| 2,632,233 A | * | 3/1953 | Luers | B23B 27/06 407/117 |
| 3,064,510 A | | 11/1962 | Floyd | |
| 3,142,117 A | * | 7/1964 | Dier | B23B 5/40 29/566 |
| 3,196,518 A | * | 7/1965 | Williams | B23B 27/06 407/120 |

(Continued)

FOREIGN PATENT DOCUMENTS

| | | | | |
|---|---|---|---|---|
| CH | 262604 A | * | 7/1949 | ........... B23B 27/065 |
| CH | 561577 A5 | * | 5/1975 | ............. B23B 27/06 |

(Continued)

*Primary Examiner* — Ryan C Rufo
(74) *Attorney, Agent, or Firm* — Luedeka Neely Group, P.C.; Michael J. Renner, Esq.

(57) ABSTRACT

A cutting tool for forming a finished part from a rotating workpiece includes a first cutting edge extending from a first end of the cutting tool, a second cutting edge extending from a second end of the cutting tool, and a shaping edge disposed between the first cutting edge and the second cutting edge. The first cutting edge is operable to remove a trailing end of the rotating workpiece and the second cutting edge is operable to remove a working portion of the rotating workpiece disposed between the trailing end and a leading end. The shaping edge is operable to shape the working portion of the rotating workpiece by advancing the cutting tool into the rotating workpiece until the first cutting edge removes the trailing end of the rotating workpiece and the second cutting edge removes the working portion of the rotating workpiece to form the finished part.

4 Claims, 2 Drawing Sheets

(56) References Cited

U.S. PATENT DOCUMENTS

| | | | | |
|---|---|---|---|---|
| 3,228,145 A * | 1/1966 | Bryson | ................ | B26D 3/006 408/27 |
| 3,543,364 A * | 12/1970 | MacKew | ................ | B23B 27/06 407/87 |
| 3,543,820 A * | 12/1970 | Tulumello | ............ | B27G 15/00 144/219 |
| 3,792,512 A * | 2/1974 | Zocher | ................ | D04H 18/02 28/115 |
| 4,854,785 A * | 8/1989 | Lowe | ................ | B23B 27/065 407/115 |
| 4,887,500 A | 12/1989 | Leiber et al. | | |
| 5,275,071 A * | 1/1994 | Plant | ................ | A23N 15/06 426/637 |
| 6,368,201 B1 * | 4/2002 | Bitz | ................ | B24D 7/18 451/358 |
| 2003/0223830 A1 * | 12/2003 | Bryan | ................ | B29C 59/022 407/119 |
| 2004/0240949 A1 * | 12/2004 | Pachao-Morbitzer | ................ | B23B 27/065 407/11 |
| 2007/0207234 A1 | 9/2007 | Li | | |
| 2012/0110861 A1 * | 5/2012 | Fradet | ................ | A47G 21/023 30/322 |

FOREIGN PATENT DOCUMENTS

| | | | | |
|---|---|---|---|---|
| DE | 927783 C | * | 5/1955 | ............ B23B 27/06 |
| DE | 3612180 A1 | * | 10/1987 | ............ B23B 27/007 |
| EP | 1038615 A1 | * | 9/2000 | ............ B23B 27/06 |
| EP | 1260295 A1 | * | 11/2002 | ............ B23B 27/06 |
| GB | 551035 A | * | 2/1943 | ............ B23B 27/06 |
| GB | 1174592 A | * | 12/1969 | ............ B23B 27/06 |
| WO | WO-8301217 A1 | * | 4/1983 | ............ B23B 27/065 |
| WO | WO 9513159 A1 | * | 5/1995 | ............ B23B 27/04 |
| WO | WO-2006118505 A1 | * | 11/2006 | ............ B23B 27/065 |
| WO | WO 2010051945 A1 | * | 5/2010 | ............ B23B 27/06 |
| WO | WO-2011105098 A1 | * | 9/2011 | ............ B23B 27/065 |

* cited by examiner

SHAPED CUTTING TOOL

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to the field of cutting tools for machining rotating work pieces. More particularly, this disclosure relates to a shaped cutting tool designed to machine a particular shape in a work piece in minimal machining steps.

BACKGROUND

In lathe machining, a workpiece is rotated along a horizontal axis for cutting of the workpiece, typically using a single-point cutting tool. A nearly finished workpiece still requires several machining steps to have material of the workpiece cut away to create the desired finished part. These steps often include multiple passes of the workpiece with respect to the cutting tool where, for example, the positioning of the workpiece or cutting tool is changed after each pass and/or the cutting tool is replaced with another cutting tool having a different shape or size. These additional steps and passes increase the time and equipment needed in creating a finished product using turning operations, which often makes the process of preparing and machining a particular shape prohibitively expensive.

What is needed therefore is a cutting tool configured to cut desired shapes out of a rotating workpiece with minimal machining steps.

SUMMARY

According to one embodiment of the disclosure, a cutting tool for forming a finished part from a rotating workpiece includes a first cutting edge extending from a first end of the cutting tool, a second cutting edge extending from a second end of the cutting tool, and a shaping edge disposed between the first cutting edge and the second cutting edge. The first cutting edge is operable to remove a trailing end of the rotating workpiece and the second cutting edge is operable to remove a working portion of the rotating workpiece disposed between the trailing end and a leading end. The shaping edge is operable to shape the working portion of the rotating workpiece by advancing the cutting tool into the rotating workpiece until the first cutting edge removes the trailing end of the rotating workpiece and the second cutting edge removes the working portion of the rotating workpiece to form the finished part.

According to certain embodiments of the disclosure, the first cutting edge has a length greater than the second cutting edge such that the trailing end of the rotating workpiece is removed prior to the working portion of the rotating workpiece; the shaping edge is substantially cylindrically shaped and the finished part is one of a sphere and an oval; the shaping edge is shaped as a perimeter of a semi-circle and the first cutting edge extends from a top portion of the shaping edge and the second cutting edge is the bottom portion of the shaping edge; and/or the shaping edge is substantially perpendicular to the first cutting edge and to the second cutting edge and the finished part is a cylinder.

According to another embodiment of the disclosure, a method of forming a finished part includes providing a cutting tool, the cutting tool including a first cutting edge extending from a first end of the cutting tool, a second cutting edge extending from a second end of the cutting tool, and a shaping edge disposed between the first cutting edge and the second cutting edge; providing a rotating workpiece, the rotating workpiece including a trailing end, a leading end, and a working portion disposed between the trailing end and the leading end; and advancing the cutting tool into the rotating workpiece such that the shaping edge shapes the working portion of the rotating workpiece until the first cutting edge removes the trailing end of the rotating workpiece and the second cutting edge removes the working portion of the rotating workpiece to form the finished part.

According to certain embodiments, the leading end of the rotating workpiece becomes a new trailing end after forming the finished part and the method further includes positioning an inner surface of the first cutting edge adjacent a top surface of the new trailing end of the rotating workpiece; and advancing the cutting tool into the rotating workpiece such that the shaping edge shapes a second working portion of the rotating workpiece between the new trailing end and a new leading end of the rotating workpiece until the second cutting edge removes the second working portion of the rotating workpiece to form a second finished part.

According to certain embodiments, the first cutting edge has a length greater than the second cutting edge such that the leading end of the rotating workpiece is removed prior to removal of the working portion of the rotating workpiece; the shaping edge is substantially cylindrically shaped and the finished part is one of a sphere and an oval; the shaping edge is shaped as a perimeter of a semi-circle and the first cutting edge extends from a top portion of the shaping edge and the second cutting edge is the bottom portion of the shaping edge; and/or the shaping edge is substantially perpendicular to the first cutting edge and to the second cutting edge and the finished part is a cylinder.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
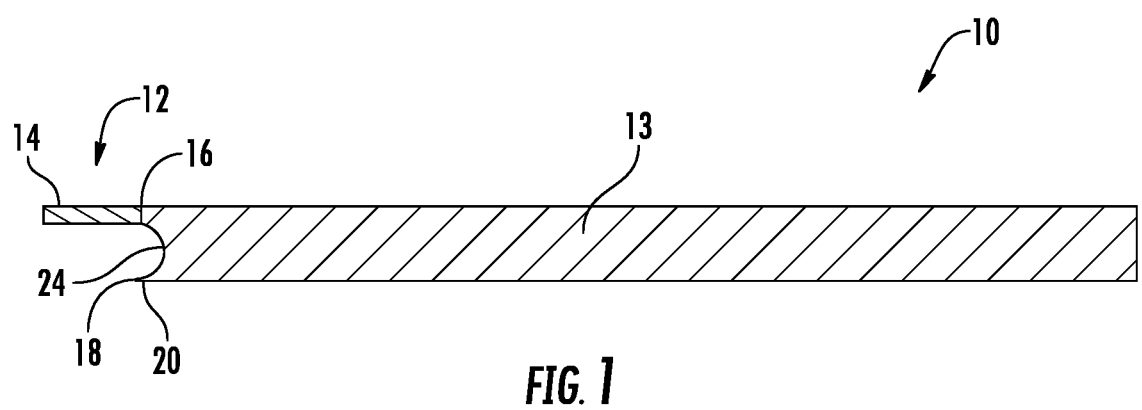
FIG. 1 depicts a cutting tool according to one embodiment of the disclosure positioned with the first cutting edge disposed above the second cutting edge.

Referring to FIG. 1, a cutting tool 10 is shown according to one embodiment of the disclosure. The cutting tool 10 generally includes a cutting portion 12 and a shank 13 configured to be secured to a tool holder (not shown) for machining a rotating workpiece. The cutting portion 12 includes a first cutting edge 14 extending from a first end 16 of the cutting portion 12 and a second cutting edge 18 extending from a second end 20 of the cutting portion 12. As described further below, the first cutting edge 14 is operable to remove a trailing end 32 of the rotating workpiece (see FIG. 2A) and the second cutting edge 18 is operable to remove a working portion 34 (see FIG. 2E) from the workpiece. As shown, the first cutting edge 14 preferably extends from the shank 13 a greater distance than the second cutting edge 18. In this preferred embodiment, the first cutting edge 14 is operable to remove the trailing end 32 of the workpiece before the second cutting edge 18 removes the working portion 34 from the workpiece. Removal of the trailing end 32 and working portion 34 from the workpiece forms a finished part 36.

Disposed substantially between the first cutting edge 14 and the second cutting edge 18 is a shaping edge 24. While the shaping edge 24 may take various forms and configurations, the shaping edge 24 is configured to create a desired shape of the working portion 34 of the rotating workpiece while the first cutting edge 14 operates to remove the trailing end 32 of the workpiece and the second cutting edge 18 operates to remove the working portion 34 from the workpiece. In other words, the cutting tool 10 is operable to create a desired shape of a finished part out of the working portion 34 of a rotating workpiece during the parting step, eliminating the need for subsequent machining steps. For purposes of the present disclosure, the "working portion" of the workpiece is the portion of the workpiece being shaped by the shaping edge 24 during the machining process while the "finished part" refers to the working portion after it is removed from the workpiece.

Referring to FIGS. 2A-2E, a process of forming a finished part is exemplified. According to this embodiment, the shaping edge 24 of the cutting tool 10 is a perimeter of a semi-circle in a concave position with respect to the first cutting edge 14 and second cutting edge 18. Further, while the first cutting edge 14 extends from a top portion 23 of the shaping edge 24 (i.e., the first cutting edge 14 extends from the top of the semi-circle), the second cutting edge 18 is the bottom portion 25 of the shaping edge 24. As a result, the shaping edge 24 of this embodiment forms a sphere as the finished part 36.

Figure 2A:
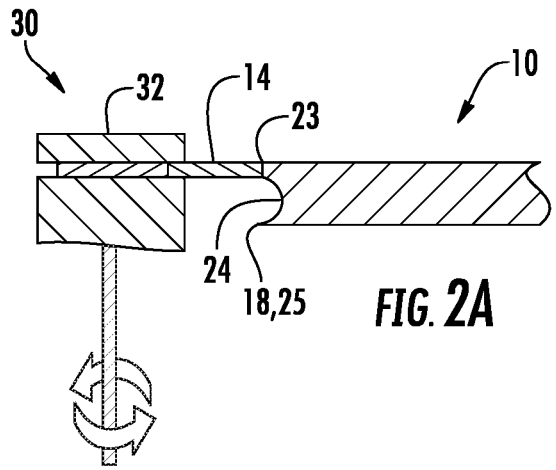
FIG. 2A depicts the cutting tool of FIG. 1 cutting through the trailing end of a rotating workpiece according to one embodiment of the disclosure.
Figure 2B:
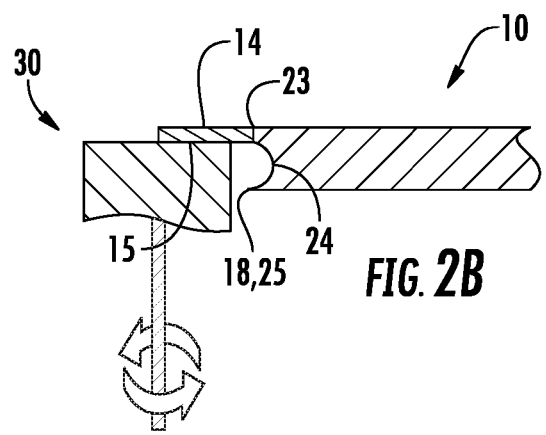
FIG. 2B depicts the cutting tool and workpiece of FIG. 2A after the trailing end of the workpiece has been removed.
Figure 2C:
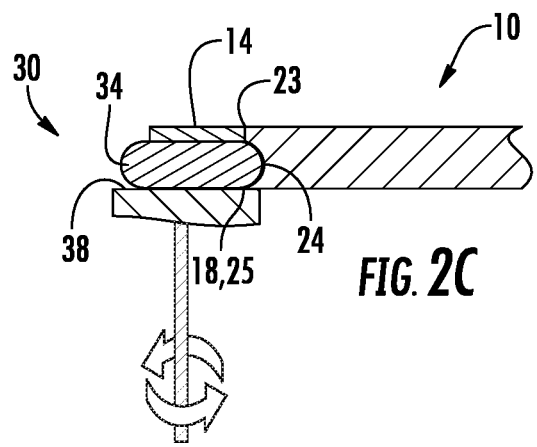
FIGS. 2C-2D depict the cutting tool and workpiece of FIGS. 2A-2B as the shaping edge of the cutting tool shapes a working portion of the workpiece.
Figure 2D:
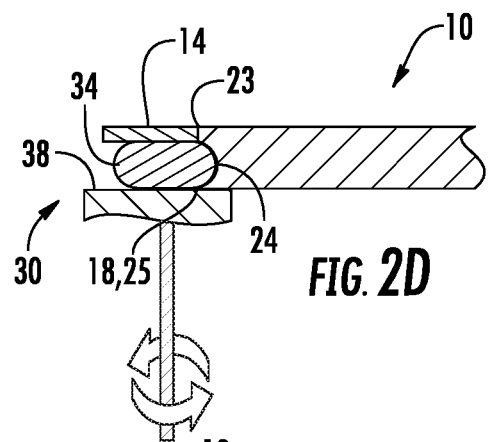
Figure 2E:
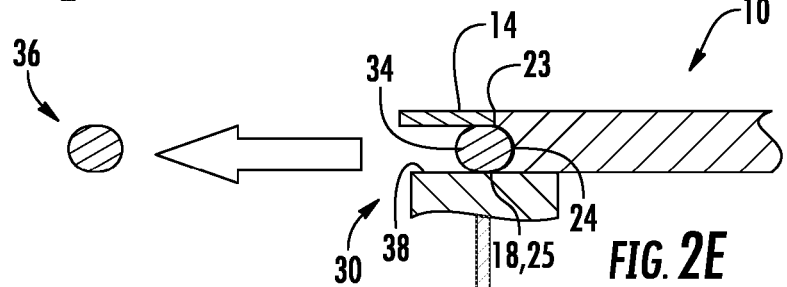
FIG. 2E depicts the cutting tool and workpiece of FIGS. 2A-2D as the second cutting edge of the tool cuts through the leading end of the workpiece to form a finished part.

As shown in FIG. 2A, the cutting tool 10 is advanced into the rotating workpiece such that the first cutting edge 14 starts cutting off the first trailing end 32 of the workpiece 30. Referring to FIG. 2B, the first cutting edge 14 removes the trailing end 32 once the first cutting edge 14 reaches the axial center of the rotating workpiece 30. Referring to FIGS. 2C-2D, the cutting tool 10 is continually advanced into the workpiece 30. During this time, the shaping edge 24 is forming the desired shape of the working portion 34 of the workpiece 30 while the second cutting edge 18 is cutting through a leading end 38 of the workpiece 30. It should be understood that the location of the leading end 38 on the workpiece 30 is determined by the positioning of the second cutting edge 18 with respect to the workpiece 30 during machining. In other words, the leading end 38 of the workpiece 30 is undefined until the cutting tool 10 is positioned with respect to the workpiece 30. Referring to FIG. 2E, once the second cutting edge 18 is advanced into the rotating workpiece 30 to the point where it reaches the axial center of the leading end 38 of the rotating workpiece 30, the working portion 34 is removed from the workpiece 30 in the form of the finished part 36. In preferred embodiments, the finished part is caught in a type of catch pan or screen disposed underneath the rotating workpiece 30.

Depending on the length of the first cutting edge 14 in relation to the width of the workpiece 30, the first cutting edge 14 may cut off the first trailing end 32 of the workpiece 30 prior to the shaping edge 24 contacting the workpiece 30 as shown in FIG. 2B. Alternately, the first cutting edge 14 may cut off the first trailing end 32 while the shaping edge 24 is forming the desired shape of the working portion 34 of the workpiece 30. In yet another embodiment, the first cutting edge 14 and second cutting edge 18 are configured to reach the axial center of the rotating workpiece 30 at precisely the same time such that the first trailing end 32 is removed at the same time as the working portion 34 is removed.

Figure 2F:
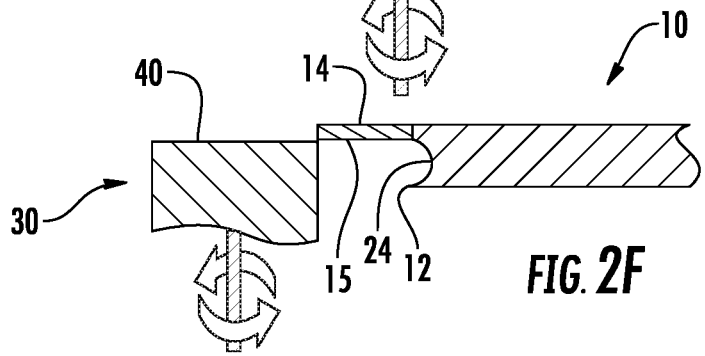
FIG. 2F depicts the cutting tool and workpiece of FIGS. 2A-2E after a finished part is formed and the first cutting edge of the cutting tool is positioned with respect to the newly formed trailing end of the workpiece.

While the process shown in FIGS. 2A-2E can be repeated to form additional finished parts 36 from the remaining workpiece 30, doing so will result in multiple trailing end 32 pieces being cut from the rotating workpiece as probable waste. To avoid such probable waste, and referring now to FIG. 2F, additional finished parts are preferably formed by positioning the inner surface 15 of the first cutting edge 14 adjacent a top surface of a newly formed trailing end 40 of the rotating workpiece 30. The newly formed trailing end 40 had been the leading end 38 of FIG. 2E before finished part 36 was removed from the workpiece 30 as shown in FIG. 2E. In other words, forming successive finished parts 36 preferably begins with positioning the cutting tool as shown in FIG. 2F and omitting the step of FIG. 2A as the rotating workpiece 30 should already be "trued" (i.e., clean and sharp) on its new trailing end 40 after the first finished part 36 is formed. The cutting tool 10 is then advanced into the rotating workpiece 30 such that the shaping edge 24 shapes a second working portion between the new trailing end 40 and a new leading end (which is determined by the positioning of the second cutting edge 18) of the rotating workpiece to form a second finished part. As a result, the process of forming finished parts can be quickly repeated after an initial finished part is formed without having to cut off a trailing end of the workpiece, which significantly saves material of the workpiece when a plurality of finished parts 36 are intended to be formed from the same workpiece 30.

It should be understood that various shapes can be formed utilizing the teachings of the present disclosure depending on the configuration of the shaping edge 24. According to certain embodiments, the shaping edge 24 is substantially cylindrically shaped as shown in FIGS. 1A-1B and 2A-2F to form rounded finished parts such as spheres, ovals, ellipses, etc. It should also be understood that the length of the second cutting edge 18 in relation to the width of the workpiece 30 determines the length of the finished part 36. For example, to make an ellipse or oval instead of a sphere, the second cutting edge 18 may be lengthened as compared to the second cutting edge 18 of FIGS. 1A-1B and 2A-2F. As a result, the second cutting edge 18 will cut through the leading end 38 of the workpiece 30 before a sphere is formed, resulting in an elliptical or oval shaped finished part 36. As another example, the shaping edge 24 may be substantially perpendicular to the first cutting edge 14 and second cutting edge 18, which would result in a cylindrically shaped finished part 36.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A cutting tool having a longitudinal axis for cutting off a finished part from a rotating workpiece, the rotating workpiece having a central axis, a trailing end, a leading end, and a working portion disposed between the trailing end and the leading end, the cutting tool comprising:
   a shank portion extending along the longitudinal axis, the shank portion including a rear side configured to be secured to a tool holder and a front side;
   a cutting portion disposed adjacent the front side of the shank portion, the cutting portion comprising:
      a first cutting edge including a proximal end and a distal end operable to remove the trailing end of the workpiece, the first cutting edge including a first sub-edge extending from the proximal end to the distal end and a straight second sub-edge at the distal end extending in a direction traversing the longitudinal axis, wherein both the proximal end and the distal end are located on an axis extending in a direction substantially parallel to the longitudinal axis;
      a second cutting edge in the form of a pointed tip is operable to remove the working portion of the workpiece after the first cutting edge removes the trailing end of the workpiece, wherein a plane that is substantially perpendicular to the longitudinal axis intersects the second cutting edge and the first cutting edge extends a distance from the plane; and
      a curved shaping edge extending from the proximal end of the first cutting edge to the second cutting edge such that the finished part is one of a sphere and an oval.

2. The cutting tool of claim 1 wherein the cutting portion consists of the first cutting edge, the second cutting edge, and the curved shaping edge.

3. A cutting tool having a longitudinal axis for cutting off a finished part from a rotating workpiece, the rotating workpiece having a central axis, a trailing end, a leading end, and a working portion disposed between the trailing end and the leading end, the cutting tool comprising:
   a shank portion extending along the longitudinal axis, the shank portion including a rear side configured to be secured to a tool holder and a front side;
   a cutting portion disposed adjacent the front side of the shank portion, the cutting portion comprising:
      a first cutting edge including a proximal end and a distal end operable to remove the trailing end of the workpiece, the first cutting edge including a first sub-edge extending from the proximal end to the distal end and a straight second sub-edge at the distal end extending in a direction traversing the longitudinal axis, wherein both the proximal end and the distal end are located on an axis extending in a direction substantially parallel to the longitudinal axis;
      a second cutting edge in the form of a tip edge is operable to remove the working portion of the workpiece after the first cutting edge removes the trailing end of the workpiece, wherein a plane that is substantially perpendicular to the longitudinal axis intersects the second cutting edge and the first cutting edge extends a distance from the plane; and
      a curved shaping edge extending from the proximal end of the first cutting edge to the second cutting edge, the curved shaping edge being concave such that, as the cutting portion is advanced towards the central axis of the rotating workpiece, the first cutting edge removes the trailing end of the workpiece when the distal end of the first cutting edge reaches the central axis of the rotating workpiece and the curved shaping edge shapes the working portion of the workpiece until the second cutting edge reaches the central axis to cut off the finished part, the finished part being one of a sphere and an oval.

4. The cutting tool of claim 3 wherein the cutting portion consists of the first cutting edge, the second cutting edge, and the curved shaping edge.

\* \* \* \* \*